(12) United States Patent
Suzuki

(10) Patent No.: US 9,581,239 B2
(45) Date of Patent: Feb. 28, 2017

(54) VEHICULAR HYDRAULICS SUPPLY DEVICE

(71) Applicant: DENSO CORPORATION, Kariya, Aichi-pref. (JP)

(72) Inventor: Fuminori Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/952,844

(22) Filed: Nov. 25, 2015

(65) Prior Publication Data

US 2016/0153449 A1    Jun. 2, 2016

(30) Foreign Application Priority Data

Nov. 28, 2014    (JP) .................................. 2014-240910

(51) Int. Cl.

| B60K 17/00 | (2006.01) |
|---|---|
| F16H 61/00 | (2006.01) |
| F04C 28/24 | (2006.01) |
| F04C 2/344 | (2006.01) |
| F04C 14/22 | (2006.01) |

(52) U.S. Cl.
CPC ............. *F16H 61/00* (2013.01); *F04C 28/24* (2013.01); *F04C 2/344* (2013.01); *F04C 14/22* (2013.01); *F04C 2270/52* (2013.01)

(58) Field of Classification Search
CPC . F04C 15/064; F04C 2/34; B62D 5/32; B60K 17/00
See application file for complete search history.

(56) References Cited

U.S. PATENT DOCUMENTS

| 4,426,194 A | * | 1/1984 | Pollman | ................ F15B 21/045 |
| | | | | 417/218 |
| 5,201,570 A | * | 4/1993 | Heren | ................. F16H 61/4035 |
| | | | | 180/197 |
| 5,209,552 A | * | 5/1993 | Reinartz | ............... B60T 8/4054 |
| | | | | 303/11 |
| 5,416,701 A | * | 5/1995 | Kawabata | ............ B60G 17/018 |
| | | | | 280/124.16 |

(Continued)

FOREIGN PATENT DOCUMENTS

| FR | 2465572 A | * | 5/2010 | ............ E02F 9/2232 |
| JP | H05-312250 | | 11/1993 | |
| JP | 2007-64268 | | 3/2007 | |

*Primary Examiner* — Hau Phan
(74) *Attorney, Agent, or Firm* — Nixon & Vanderhye P.C.

(57) ABSTRACT

A variable capacity type oil pump, which is driven by an engine, supplies hydraulic pressure to a hydraulic control circuit of an automatic transmission. A range switch mechanism, which includes a motor as a motive power source, switches a shift range of the automatic transmission. Further, a switch operation mechanism, which switches a discharge amount of the oil pump, is driven by the motor of the range switch mechanism. In this case, an operative position of the switch operation mechanism is switched by the motor according to an input rotation speed of the oil pump, thereby switching the discharge amount of the oil pump. Accordingly, the motor of the range switch mechanism is used to drive the switch operation mechanism to switch the discharge amount of the oil pump, and thus a motive power source dedicated to changing the discharge amount of the oil pump is not needed.

7 Claims, 12 Drawing Sheets

(56) References Cited

U.S. PATENT DOCUMENTS

| | | | | |
|---|---|---|---|---|
| 5,865,602 A | * | 2/1999 | Nozari | F04B 1/324 |
| | | | | 417/212 |
| 2004/0250536 A1 | * | 12/2004 | Soerensen | B62D 5/32 |
| | | | | 60/384 |
| 2008/0227599 A1 | | 9/2008 | Takagi | |
| 2011/0120297 A1 | * | 5/2011 | Bitter | F15B 20/007 |
| | | | | 91/468 |

\* cited by examiner

MID DISCHARGE MODE

LOW DISCHARGE MODE

VEHICULAR HYDRAULICS SUPPLY DEVICE

CROSS REFERENCE TO RELATED APPLICATION

The present application is based on Japanese Patent Application No. 2014-240910 filed on Nov. 28, 2014, disclosure of which is incorporated herein by reference.

TECHNICAL FIELD

The present disclosure relates to a vehicular hydraulics supply device that includes a variable-capacity type oil pump having a variable discharge amount.

BACKGROUND

JP 2007-064268 A describes an exemplary automatic transmission mounted on a vehicle. In this automatic transmission, an engine rotation-driven oil pump supplies hydraulic pressure to a hydraulic control circuit. A hydraulic valve and a manual valve are provided in the hydraulic control circuit to switch a hydraulic circuit and to control a hydraulic pressure. Here, the hydraulic pressure is applied to friction engagement elements (e.g., a brake or a clutch) of a transmission mechanism. As a result, gear shifting, or range shifting, is performed.

This kind of automatic transmission includes a hydraulic supply system equipped with a variable-capacity type oil pump. A discharge amount of the oil pump is adjusted by a solenoid valve. When a rotational speed of the engine increases and, as a result, the rotational speed input to the oil pump exceeds a predetermined value, the solenoid valve switches the oil pump to a low discharge mode (i.e., a mode in which the discharge amount per revolution is low). As a result, excess discharge during high rotational speeds may be prevented, and wasteful energy consumption may be suppressed, thereby improving fuel consumption.

SUMMARY

However, according to the above described conventional technology, a motive power source (e.g., a solenoid) must be provided to adjust the discharge amount of the variable-capacity type oil pump. Accordingly, the cost of the hydraulic supply system is increased, and a larger installation space is required. As a result, there is a concern that recent growing demands for low cost and space efficient technology may be not satisfied.

Accordingly, an object of the present disclosure is to provide a vehicular hydraulics supply device which does not require a motive power source dedicated to adjusting a discharge amount of a variable-capacity type oil pump, thereby satisfying low cost and space efficiency demands.

In view of the above, according to the present disclosure, there is provided a vehicular hydraulics supply device for a vehicle including a variable-capacity oil pump, the oil pump having a variable discharge amount and being rotatably driven by a motive power source of the vehicle. The vehicular hydraulics supply device includes an electric actuator that acts as a motive power source of a range switch mechanism, the range switch mechanism switching a range of a transmission, and a switch operation mechanism driven by the electric actuator to perform a switch operation for adjusting the discharge amount of the oil pump.

In this configuration, the electric actuator, which is a motive power source of the range switch mechanism, is used to drive the switch operation mechanism to change the discharge amount of the oil pump. Accordingly, it is not necessary to provide a dedicated motive power source (e.g., a solenoid or such) for changing the discharge amount of the oil pump (for example, the dedicated motive power sources used in conventional systems may be omitted), and the hydraulics supply system may satisfy low cost and space efficiency demands.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
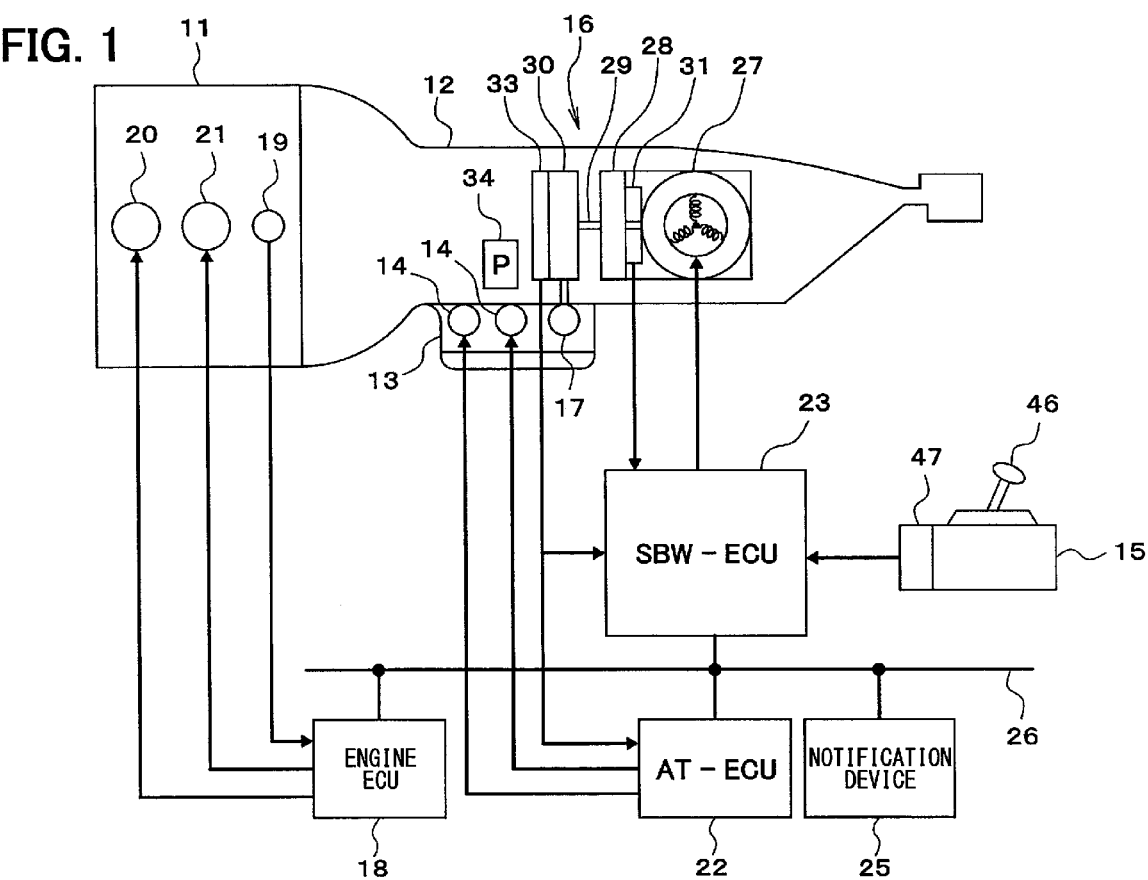
FIG. 1 is an outline view showing an automatic transmission control system of the present disclosure.

Hereinafter, a plurality of embodiments which embody the present disclosure will be explained in detail.

First Embodiment

A first embodiment of the present disclosure will be explained with reference to FIGS. 1 to 7.

First, an outline configuration of a vehicular automatic transmission control system will be explained with reference to FIG. 1.

An output shaft (e.g., a crank shaft) of an engine 11, which is the power source of a vehicle, is coupled to an input shaft of an automatic transmission 12. The automatic transmission 12 includes a transmission gear mechanism (not illustrated) and a hydraulic control circuit 13. The transmission gear mechanism includes a plurality of friction engagement elements (not illustrated) such as a clutch or a brake for switching a gear position (i.e., a transmission gear ratio).

Further, the hydraulic control circuit 13 includes hydraulic control valves 14 and a manual valve 17. The hydraulic control valves 14 control a hydraulic pressure applied to the friction engagement elements. The manual valve 17 switches a hydraulic circuit for a hydraulic oil applied to the friction engagement elements. A range selector 15 is coupled to a range switch mechanism 16. When the range selector 15 is operated, the range switch mechanism 16 drives the manual valve 17.

Further, the automatic transmission 12 includes an oil pump 34 (which may be, for example, a vane-type oil pump) that is rotatably driven by the engine 11 (e.g., driven by the rotation of the input shaft of the transmission gear mechanism). The hydraulic oil discharged by the oil pump 34 is supplied to the hydraulic control circuit 13, thereby supplying hydraulic pressure to the hydraulic control circuit 13. Further, the oil pump 34 is a variable-capacity type oil pump having a variable discharge amount.

An engine electronic control unit (ECU) 18 controls the engine 11. Specifically, the engine ECU 18 controls a throttle opening (i.e., an opening angle of a throttle valve) of a throttle device 20 and a fuel injection amount of a fuel injection valve 21 based on output signals such as an accelerator position (i.e., a depression amount of an accelerator pedal) detected by an accelerator sensor 19.

An automatic transmission ECU (AT-ECU) 22 controls a gear shift operation of the automatic transmission 12. Specifically, the AT-ECU 22 switches a gear position of the automatic transmission 12 to a target gear position by controlling each hydraulic control valve 14 in the hydraulic control circuit 13 to open and close, thereby controlling the hydraulic pressure applied to the friction engagement elements.

A shift-by-wire ECU (SBW-ECU) 23 controls a range switch operation of the automatic transmission 12. Specifically, the SBW-ECU 23 controls a motor 27 of the range switch mechanism 16 based on a requested range signal. The requested range signal corresponds to an operation of an operation lever 46 (i.e., an operation portion) of the range selector 15. Accordingly, the SBW-ECU 23 switches the manual valve 17 according to a range switch operation performed by a driver, thereby switching a shift range of the automatic transmission 12. The range selector 15, the range switch mechanism 16, and the SBW-ECU 23 form a shift-by-wire system.

The engine ECU 18, the AT-ECU 22, the SBW-ECU 23, and a notification device 25 are connected together by a communication line 26 such as an on-board local area network (LAN) circuit, and send and receive necessary information to each other through, e.g., controller area network (CAN) communication.

Figure 2:
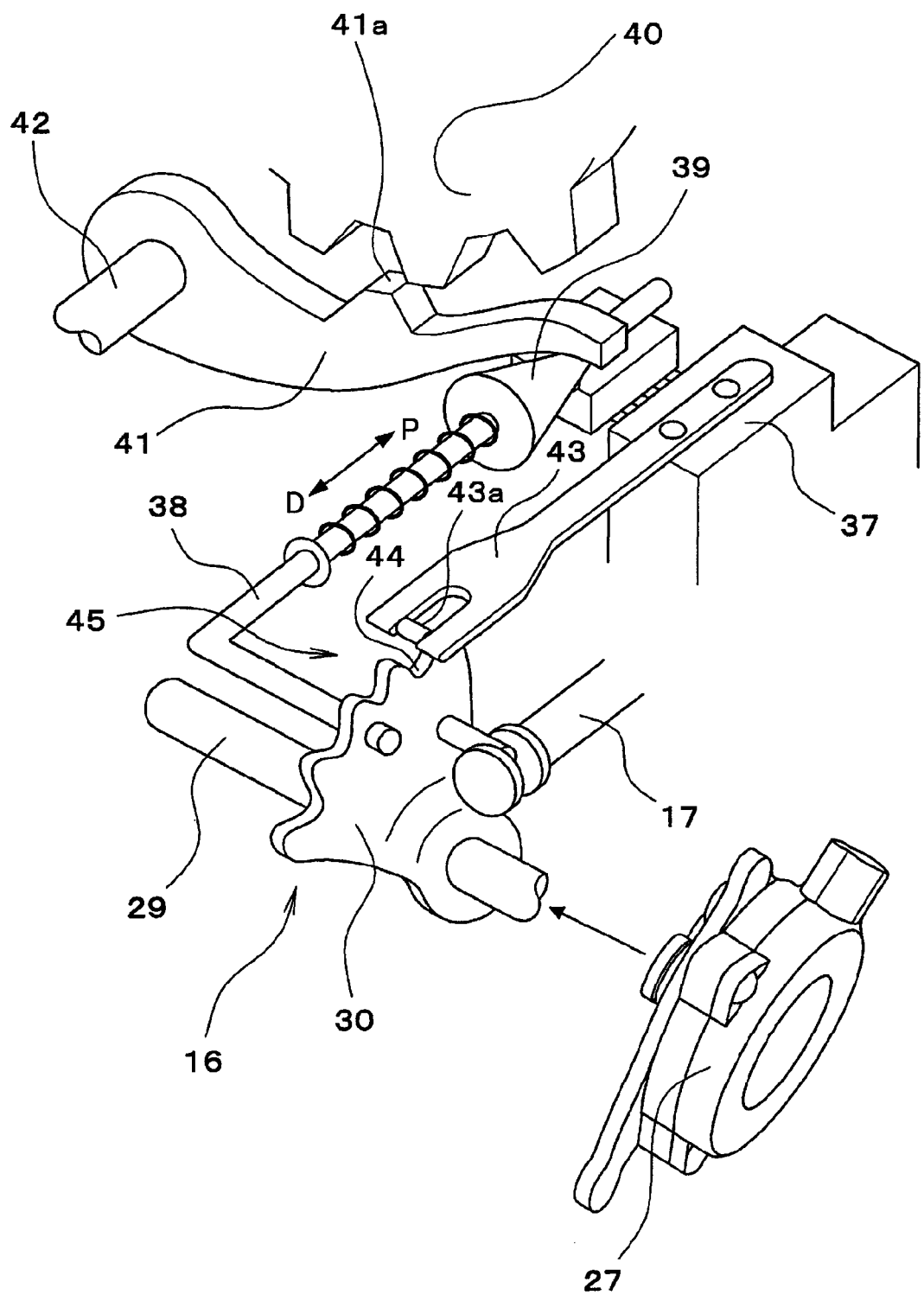
FIG. 2 is a perspective view showing a range switch mechanism.
Figure 3:
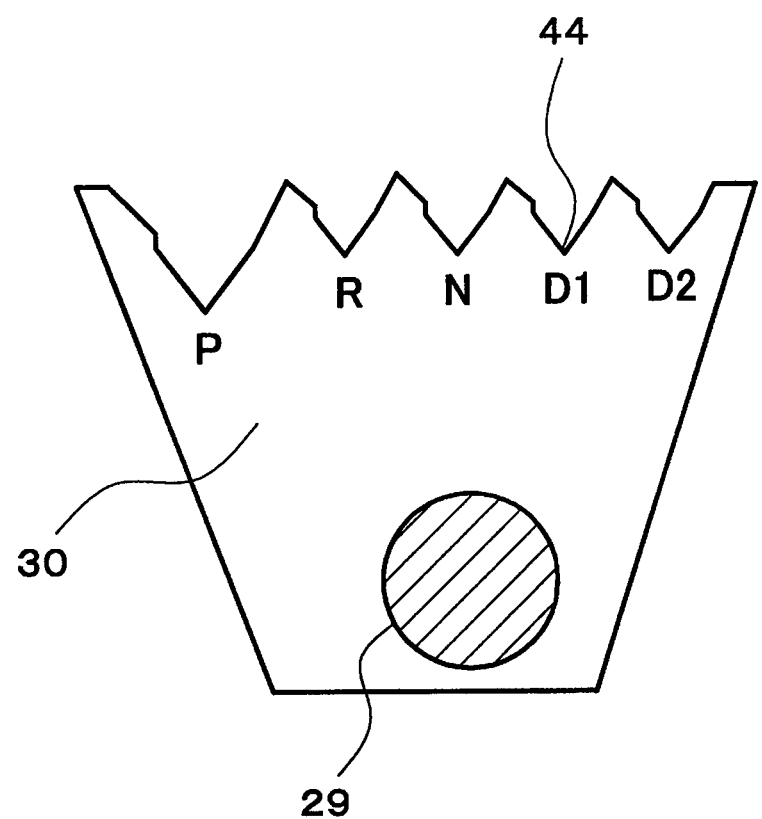
FIG. 3 is a front view showing a detent lever.

As shown in FIG. 2, the range switch mechanism 16 may be a four-position type range switch mechanism that switches the shift range of the automatic transmission 12 between a P range (i.e., parking range), an R range (i.e., a reverse range), an N range (i.e., a neutral range), and a D range (i.e., a drive range). The motor 27, which is an electric actuator, acts as an motive power source for the range switch mechanism 16. The motor 27 may be, for example, a switched reluctance motor. A rotating shaft of the motor 27 is coupled to a manual shaft 29 through a reduction mechanism 28 (refer to FIG. 1). The manual shaft 29 is fixed to a detent lever 30. Further, the detent lever 30 is coupled to the manual valve 17. Here, the manual valve 17 is linearly displaced according to a rotation of the detent lever 30. The hydraulic circuit of the automatic transmission 12 is switched by the manual valve 17, thereby switching the shift range. According to the above, the shift range of the automatic transmission 12 may be controlled according to the rotation angle of the motor 27.

Further, an L-shaped parking rod 38 is fixed to the detent lever 30. A cone body 39 is disposed at the leading end of the parking rod 38, and abuts a lock lever 41. The lock lever 41 rotates about a shaft 42 according to the position of the cone body 39, thereby locking and unlocking a parking gear 40. The parking gear 40 is disposed in the automatic transmission 12, and when the parking gear 40 is locked with the lock lever 41, the driving wheels of the vehicle are held in a stopped state (i.e., a parking state).

A detent spring 43 is fixed to a support base 37 to retain the detent lever 30 in each of the P, R, N, and D ranges. Meanwhile, the detent lever 30 includes a plurality of range retention recesses 44 corresponding to each of the P, R, N, and D ranges. Further, in the first embodiment, the D range includes a D1 range and a D2 range, and the detent lever 30 includes a respective range retention recess 44 for each of the D1 range and the D2 range (refer to FIG. 3).

An engagement portion 43a is provided at the tip of the detent spring 43. When the engagement portion 43a is engaged in each of the range retention recesses 44 of the detent lever 30, the detent lever 30 is retained at the position of the each range. The detent lever 30 and the detent spring 43 form a detent mechanism 45 that engages and maintains the rotational position of the detent lever 30 at each range (in other words, maintaining the range switch mechanism 16 at each range).

In the P range, the parking rod 38 is displaced toward the lock lever 41, and a wide portion of the cone body 39 raises the lock lever 41. As a result, a protrusion portion 41a of the lock lever 41 engages the parking gear 40 to lock the parking gear 40. Accordingly, an output shaft of the automatic transmission 12 (in other words, the driving wheels) is held in a locked state, i.e., a parked state.

When not in the P range, the parking rod 38 is displaced away from the lock lever 41, and the wide portion of the cone body 39 is pulled out from the lock lever 41, thereby lowering the lock lever 41. As a result, the protrusion portion 41a of the lock lever 41 is disconnected from the parking gear 40 to unlock the parking gear 40. Accordingly, the output shaft of the automatic transmission 12 is maintained in a rotatable state, i.e., a movable state.

As shown in FIG. 1, the motor 27 includes an encoder 31, which is a rotation angle sensor, that detects the rotation angle (or rotation position) of a rotor of the motor 27. The encoder 31 may be, for example, a magnetic rotary encoder. The encoder 31 is synchronized with the rotation of the rotor of the motor 27, and outputs a pulse signal to the SBW-ECU 23 after every predetermined angle. The SBW-ECU 23 counts the pulse signals from the encoder 31 and, based on this count value (hereinafter referred to as an "encoder count value"), switches a conduction phase of the motor 27 in a predetermined order to drive the motor 27. As described above, the shift range of the automatic transmission 12 is changed according to the rotation angle of the motor 27. Accordingly, the encoder count value indirectly indicates the actual shift range.

Further, a rotation sensor 33 is provided to detect the rotation angle (or rotation position) of the manual shaft 29 or the detent lever 30. The rotation sensor 33 may be, for example, a potentiometer, and outputs a voltage according to the rotation angle of the manual shaft 29 or the detent lever 30. Based on this output voltage, one of the P range, R range, N range, and D range may be identified as the actual shift range.

The range selector 15 includes the operation lever 46 and a selector sensor 47. The operation lever 46 is used by the driver to select a range, and the selector sensor 47 outputs a requested range signal according the operation of the operation lever 46.

The SBW-ECU 23 switches the target range according to the requested range signal output by the range selector 15 (or more specifically, the selector sensor 47). Then, the SBW-ECU 23 uses the encoder count value to drive the motor 27 to rotate to a target rotation position (or target count value) corresponding to the target range, thereby switching the shift range to the target range.

Next, a switch operation mechanism 48 will be explained with reference to FIGS. 4 and 5. The switch operation mechanism 48 is driven by the motor 27 of the range switch mechanism 16 to perform a switch operation for changing the discharge amount of the oil pump 34.

Figure 4:
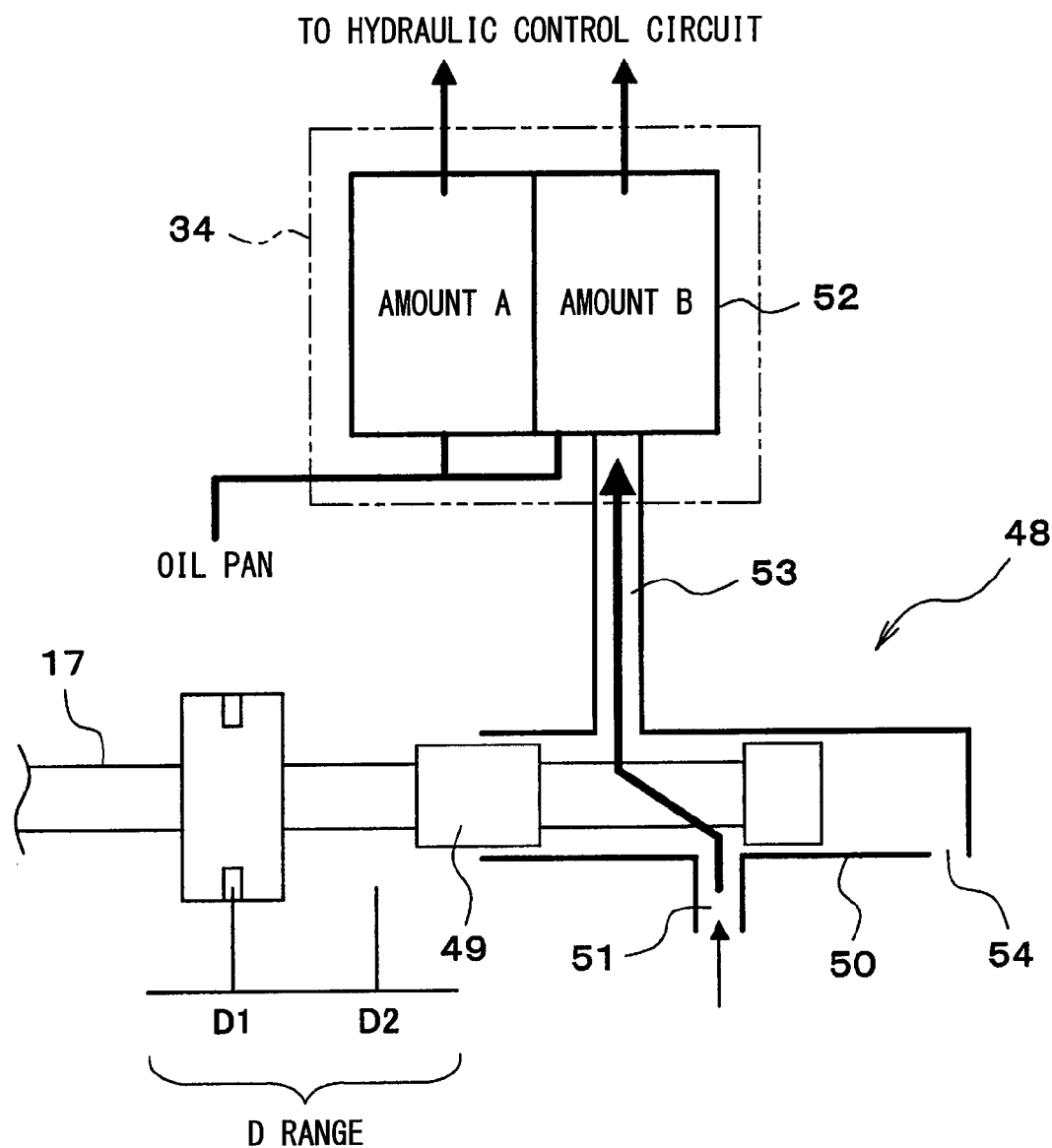
FIG. 4 is a view showing a switch operation mechanism and surrounding elements thereof during a high discharge mode.
Figure 5:
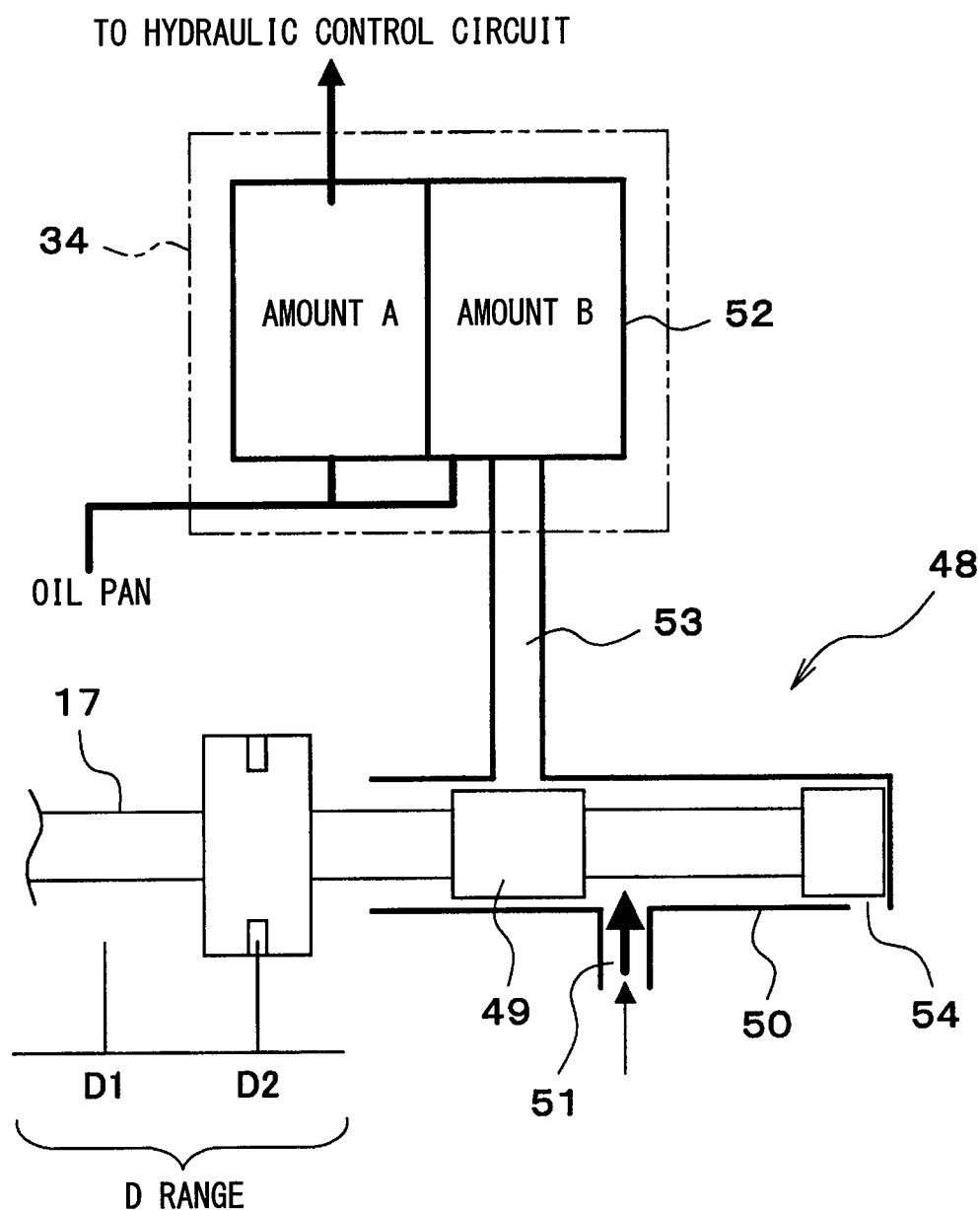
FIG. 5 is a view showing a switch operation mechanism and surrounding elements thereof during a low discharge mode.

As shown in FIGS. 4 and 5, the variable-capacity type oil pump 34 includes a varier unit 52 that varies a discharge amount per revolution. The switch operation mechanism 48 switches the hydraulic pressure applied to the varier unit 52 of the oil pump 34, thereby adjusting the discharge amount of the oil pump 34. The switch operation mechanism 48 includes a switch valve 49 that switches a hydraulic circuit. The switch valve 49 is disposed to integrally move with the manual valve 17. A sleeve 50 for the switch valve 49 includes an inlet port 51, a supply port 53, and a drain port 54. Hydraulic pressure is introduced through the inlet port 51. Further, the supply port 53 is in fluid communication with the varier unit 52 of the oil pump 34.

When the manual valve 17 is driven by the motor 27, which acts as a motive power source for the range switch mechanism 16, the manual valve 17 is displaced in the axial direction. As a result, the switch valve 49, which integrally moves with the manual valve 17, is also displaced in the axial direction by the motor 27 of the range switch mechanism 16. A D range position of the manual valve 17 includes two switchable positions, a D1 range position (i.e., when the engagement portion 43a of the detent spring 43 is engaged in the range retention recess 44 of the detent lever 30 for the D1 range) and a D2 range position (i.e., when the engagement portion 43a of the detent spring 43 is engaged in the range retention recess 44 of the detent lever 30 for the D2 range). Regardless of whether the manual valve 17 is in the D1 range position or the D2 range position, the hydraulic circuit of the automatic transmission 12 is maintained in the D range hydraulic circuit, such that the automatic transmission 12 is maintained in the D range.

Figure 6:
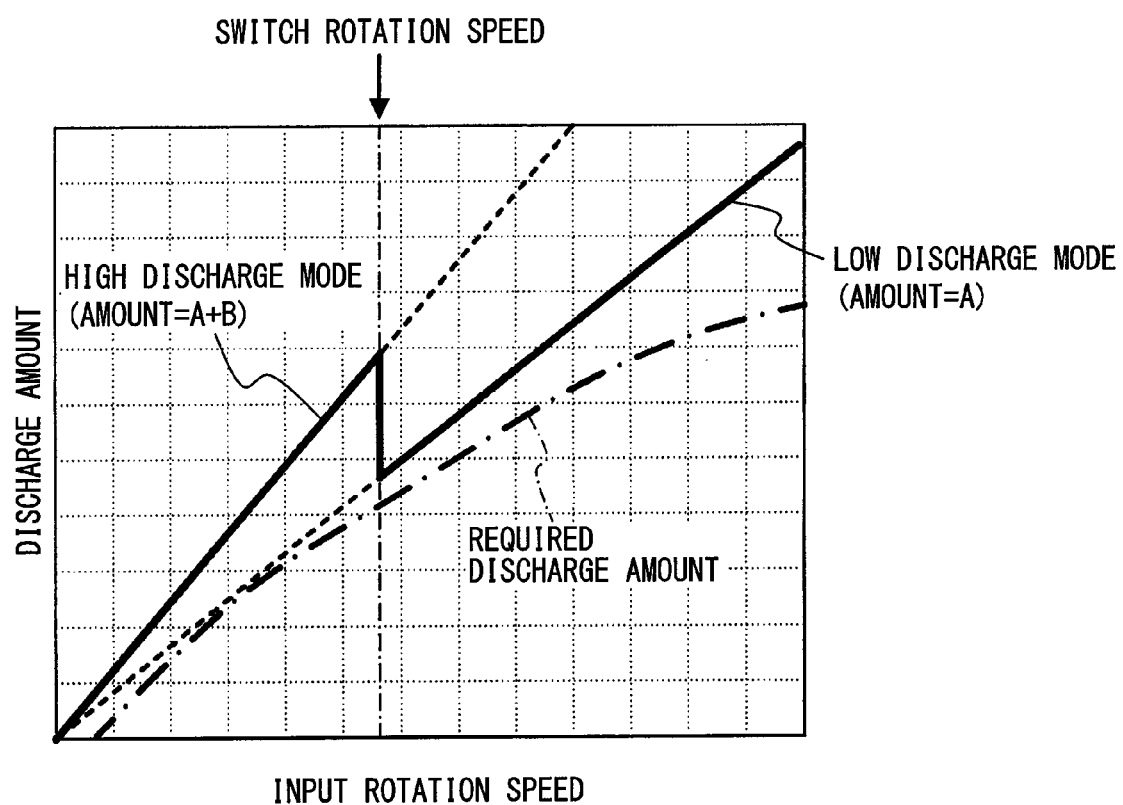
FIG. 6 is a chart showing a relationship between an input rotation speed and a discharge amount of an oil pump.

As shown in FIG. 4, when the manual valve 17 is moved to the D1 range position, the switch valve 49 moves to a position that opens the supply port 53 (i.e., a first operative position). Thus, an oil passage is open from the inlet port 51 to the supply port 53, thereby forming an oil passage supplying hydraulic pressure through the supply port 53 to the varier unit 52 of the oil pump 34. In other words, hydraulic pressure introduced through the inlet port 51 into the sleeve 50 of the switch valve 49 is supplied through the supply port 53 to the varier unit 52 of the oil pump 34. As a result, the oil pump 34 is switched to a high discharge mode. As shown in FIG. 6, in the high discharge mode, the discharge amount of the oil pump 34 per revolution is higher than that of a low discharge mode. For example, the high discharge mode may have a discharge amount per revolution of A+B.

Meanwhile, as shown in FIG. 5, when the manual valve 17 is moved to the D2 range position, the switch valve 49 moves to a position that closes the supply port 53 (i.e., a second operative position). Thus, the oil passage from the inlet port 51 to the supply port 53 is closed. As a result, the supply of hydraulic pressure to the varier unit 52 of the oil pump 34 is stopped, and the oil pump 34 is switched to the low discharge mode. As shown in FIG. 6, in the low discharge mode, the discharge amount of the oil pump 34 per revolution is lower than that of the high discharge mode. For example, the low discharge mode may have a discharge amount per revolution of A.

In other words, when the manual valve 17 is switched between the D1 range position and the D2 range position, the switch operation mechanism 48 switches the switch valve 49 between positions opening the supply port 53 and closing the supply port 53. As a result, the discharge amount of oil pump 34 is switched between two levels.

Further, when the manual valve 17 is in a position other than the D range position (e.g., a P range position, an R range position, or an N range position), hydraulic pressure is supplied to the varier unit 52 of the oil pump 34, and the oil pump 34 is maintained in the high discharge mode.

In the first embodiment, the AT-ECU 22 performs a discharge amount switching control routine as will be described later with reference to FIG. 7. In this control routine, the AT-ECU 22 reads the input rotation speed of the oil pump 34 when the manual valve 17 is in the D range position. Based on this input rotation speed, the position of the manual valve 17 (i.e., the position of the switch valve 49) is switched using the motor 27, thereby switching the discharge amount of the oil pump 34 between two levels.

Specifically, as shown in FIG. 6, when the input rotation speed of the oil pump 34 is at or below a predetermined switching rotation speed, the manual valve 17 is switched to the D1 range position using the motor 27. As a result, the switch valve 49 is switched to the position opening the supply port 53, and the oil pump 34 is switched over to the high discharge mode.

Conversely, when the input rotation speed of the oil pump 34 is above the switching rotation speed, the manual valve 17 is switched to the D2 range position using the motor 27. As a result, the switch valve 49 is switched to the position closing the supply port 53, and the oil pump 34 is switched over to the low discharge mode. Further, the switching rotation speed may be set, for example, to ensure that even when switched to the low discharge mode, the discharge amount of the oil pump 34 is maintained at or above a required discharge amount of the hydraulic control circuit 13.

Hereinafter, the discharge amount switching control routine of FIG. 7, which is performed by the AT-ECU 22 of the first embodiment, will be explained.

Figure 7:
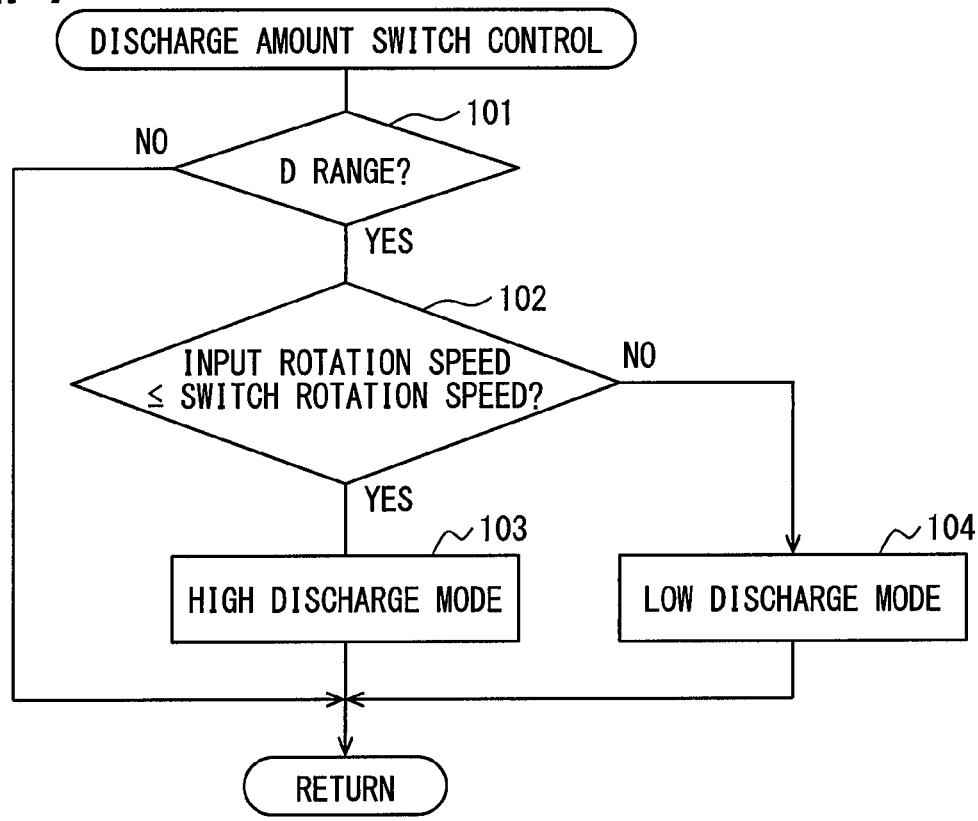
FIG. 7 is a flowchart showing processing of a discharge amount switching control routine.

The AT-ECU 22, when powered on, periodically and repeatedly performs the discharge amount switching control routine shown in FIG. 7. In this regard, when processing this control routine, the AT-ECU 22 acts as a controller.

The present control routine beings at step 101, where it is determined whether the current shift range is the D range (i.e., whether the manual valve 17 is in the D range position). At step 101, if it is determined that the current shift range is not the D range, the processing of step 102 and beyond is not performed, and the present control routine terminates.

Conversely, if it is determined at step 101 that the current shift range is the D shift range, then the control routine continues to step 102. At step 102, it is determined whether the input rotation speed of the oil pump 34 (e.g., the rotation speed of the input shaft of the transmission gear mechanism) is at or below the predetermined switching rotation speed.

At step 102, if it is determined that the input rotation speed of the oil pump 34 is at or below the switching rotation speed, then the control routine proceeds to step 103. At step 103, the manual valve 17 is switched to (or maintained at) the D1 range position by the motor 27, and thus the switch valve 49 is switched to (or maintained at) the position opening the supply port 53. As a result, the oil pump 34 is switched to (or maintained at) the high discharge mode. In the high discharge mode, the discharge amount of the oil pump 34 per revolution is higher than that of the low discharge mode. For example, the high discharge mode may have a discharge amount per revolution of A+B.

Conversely, if it is determined at step 102 that the input rotation speed of the oil pump 34 is above the switching rotation speed, the control routine proceeds to step 104. At step 104, the manual valve 17 is switched to (or maintained at) the D2 range position by the motor 27, and thus the switch valve 49 is switched to (or maintained at) the position closing the supply port 53. As a result, the oil pump 34 is switched to (or maintained at) the low discharge mode. In the low discharge mode, the discharge amount of the oil pump 34 per revolution is lower than that of the high discharge mode. For example, the low discharge mode may have a discharge amount per revolution of A.

In the above described first embodiment, a system includes the range switch mechanism 16 that switches the shift range of the automatic transmission 12 with the motor 27 as a motive power source. In this system, the switch operation mechanism 48 is driven by the motor 27 of the range switch mechanism 16. The switch operation mechanism 48 performs a switch operation that changes the discharge amount of the variable-capacity type oil pump 34. Thus, by using the motor 27 of the range switch mechanism 16 to drive the switch operation mechanism 48, the discharge amount of the oil pump 34 may be adjusted. As a result, it is not necessary to provide a motive power source (such as a solenoid) dedicated to adjusting the discharge amount of the variable-capacity type oil pump 34. In other words, such a dedicated motive power source may be omitted. Accordingly, the hydraulic supply system of the automatic transmission 12 may satisfy low cost, energy efficiency, and space efficiency demands.

Further, in the first embodiment, the oil pump 34 is used to supply hydraulic pressure to the hydraulic control circuit 13 of the automatic transmission 12. Further, the motor 27 of the range switch mechanism 16 is used to drive the switch operation mechanism 48 for the oil pump 34 of the automatic transmission 12. Here, the motor 27 of the range switch mechanism 16 may be positioned relatively close to the oil pump 34 of the automatic transmission 12. As a result, it is possible to easily configure the motor 27 of the range switch mechanism 16 to drive the oil pump 34 of the automatic transmission 12, without performing extensive restructuring.

Further, in the first embodiment, the motor 27 is used to switch the position of the manual valve 17 (in other words, the operative position of the switch valve 49) based on the input rotation speed of the oil pump 34, thereby switching the discharge amount of the oil pump 34 between two levels. As a result, the discharge amount of the oil pump 34 may be maintained above a required discharge amount of the hydraulic control circuit 13 even during low rotation speeds, while excessive discharging may be prevented during high rotations speeds. Accordingly, wasteful energy consumption may be suppressed, and fuel economy may be improved.

Further, in the first embodiment, the switch operation mechanism 48 includes the switch valve 49 driven by the motor 27 of the range switch mechanism 16. This switch valve 49 is switched between a position that opens the supply port 53 and a position that closes the supply port 53, thereby switching the discharge amount of the oil pump 34 between two levels. As a result, the discharge amount of the oil pump 34 may be switched between two levels with a relatively simple construction.

Second Embodiment

Next, a second embodiment of the present disclosure will be explained with reference to FIGS. 8 to 13. However, explanations of elements which are substantially similar to those of the above described first embodiment may be omitted or simplified. The following explanation will mainly focus on points which differ from the above described first embodiment.

In the first embodiment, the discharge amount of the oil pump 34 is switched between two levels according to the input rotation speed of the oil pump 34. However, in the second embodiment, the discharge amount of the oil pump 34 is switched between three levels according to the input rotation speed of the oil pump 34.

Figure 8:
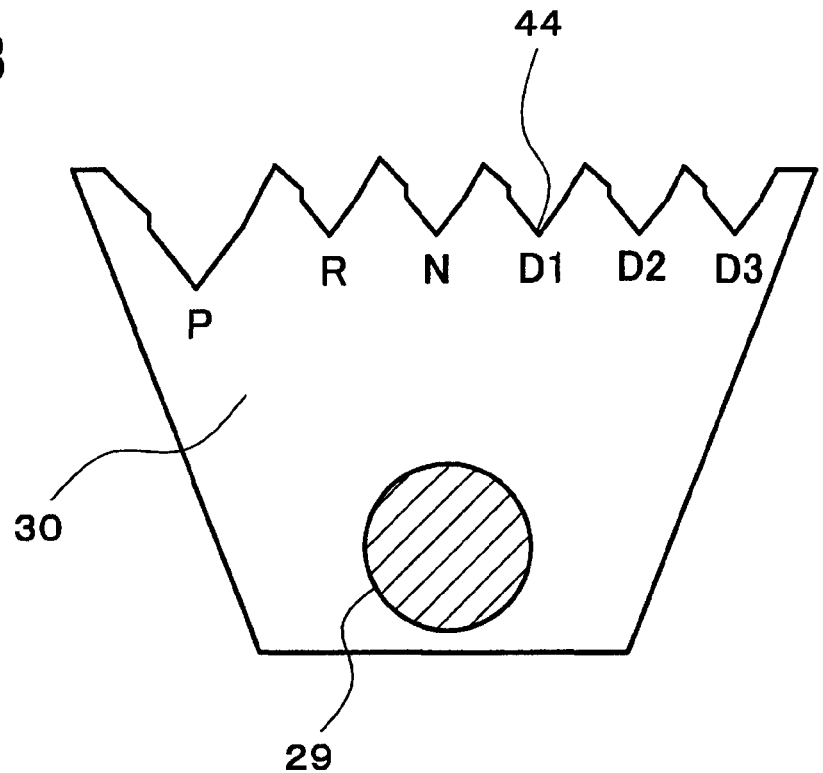
FIG. 8 is a front view of a detent lever.

In the second embodiment, as shown in FIG. 8, the D range includes the D1 range, the D2 range, and a D3 range. Further, the detent lever 30 includes a respective range retention recess 44 for each of the D1, D2, and D3 ranges.

Figure 9:
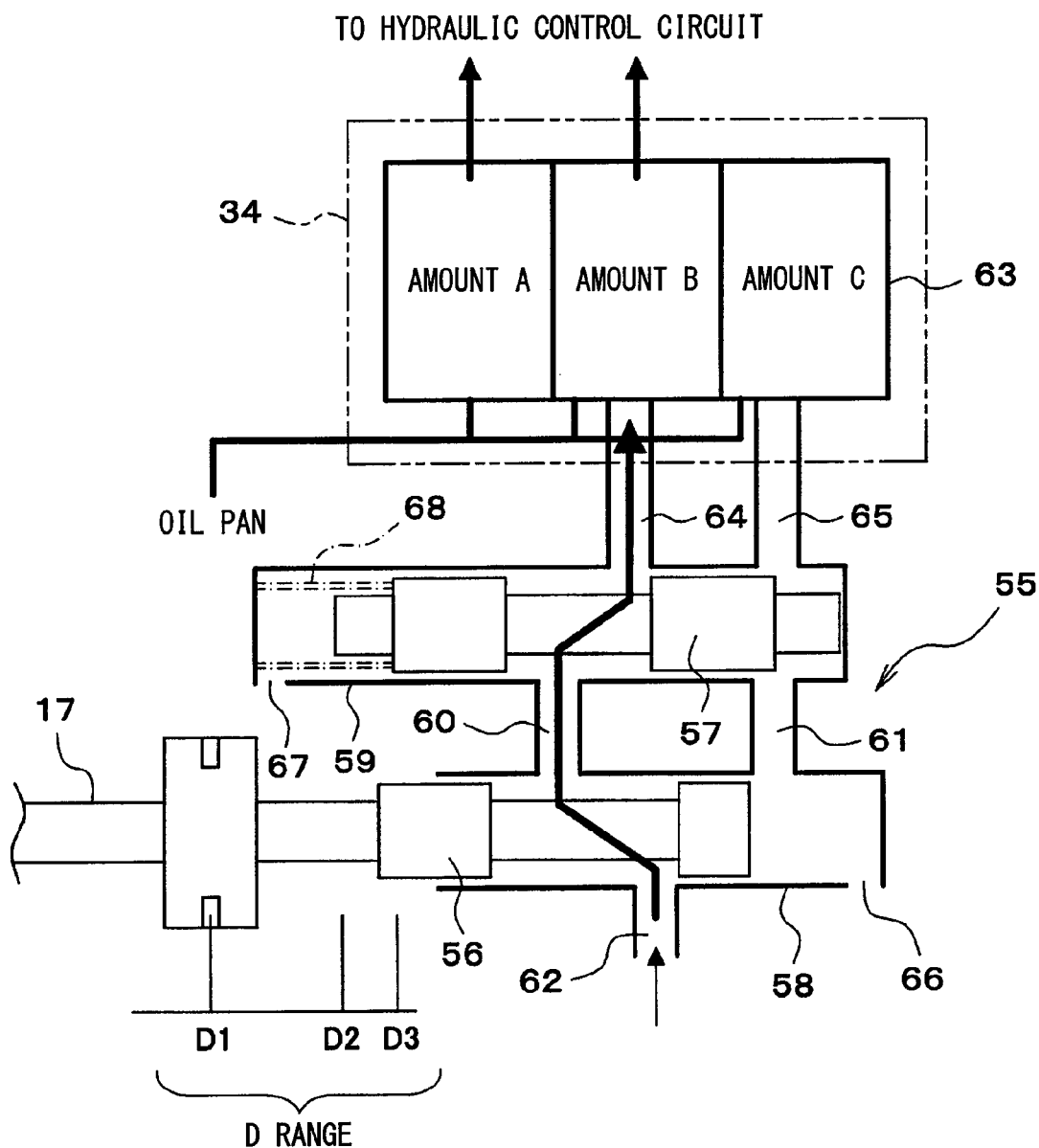
FIG. 9 is a view showing a switch operation mechanism and surrounding elements thereof during a high discharge mode.
Figure 10:
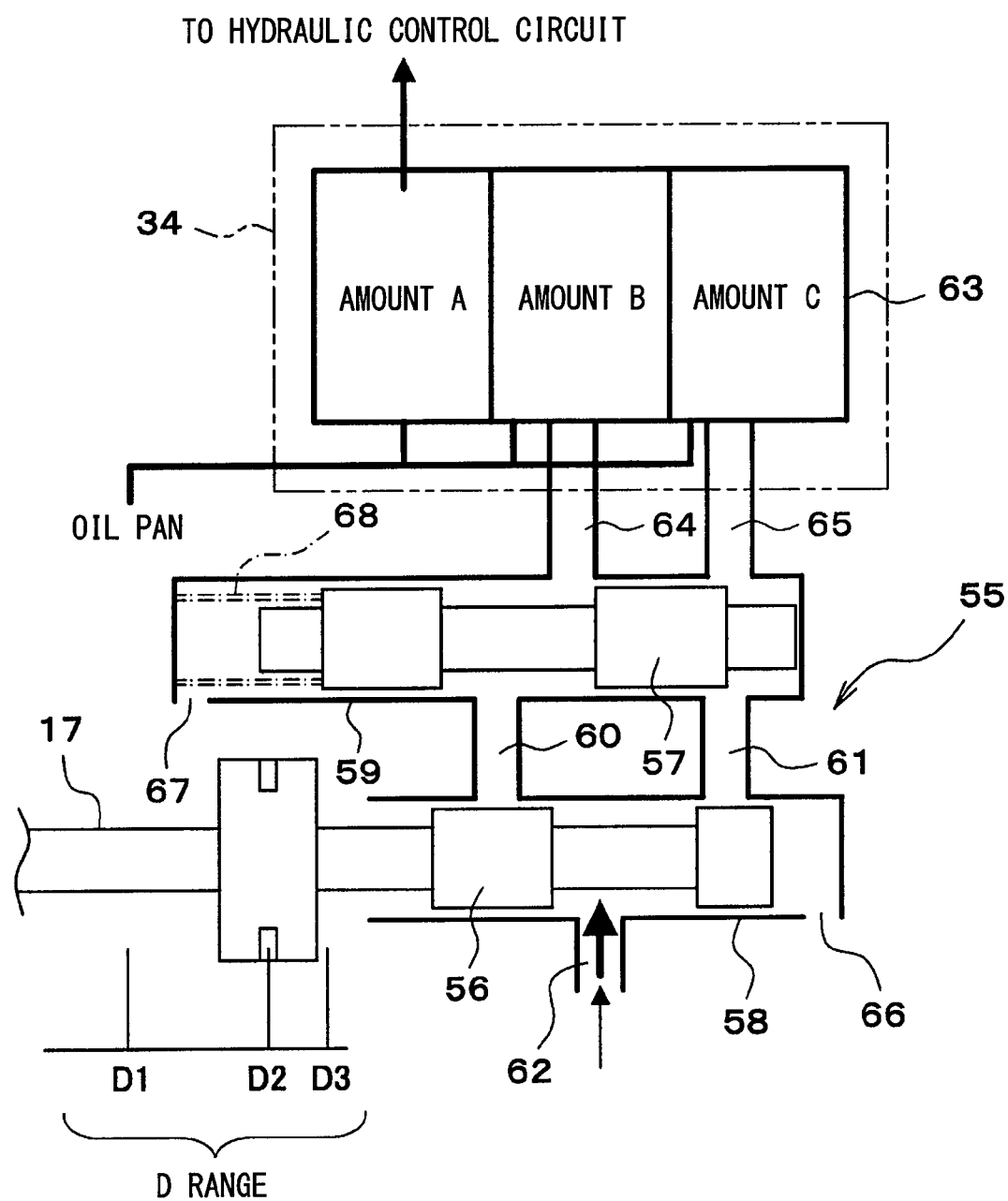
FIG. 10 is a view showing a switch operation mechanism and surrounding elements thereof during a mid discharge mode.
Figure 11:
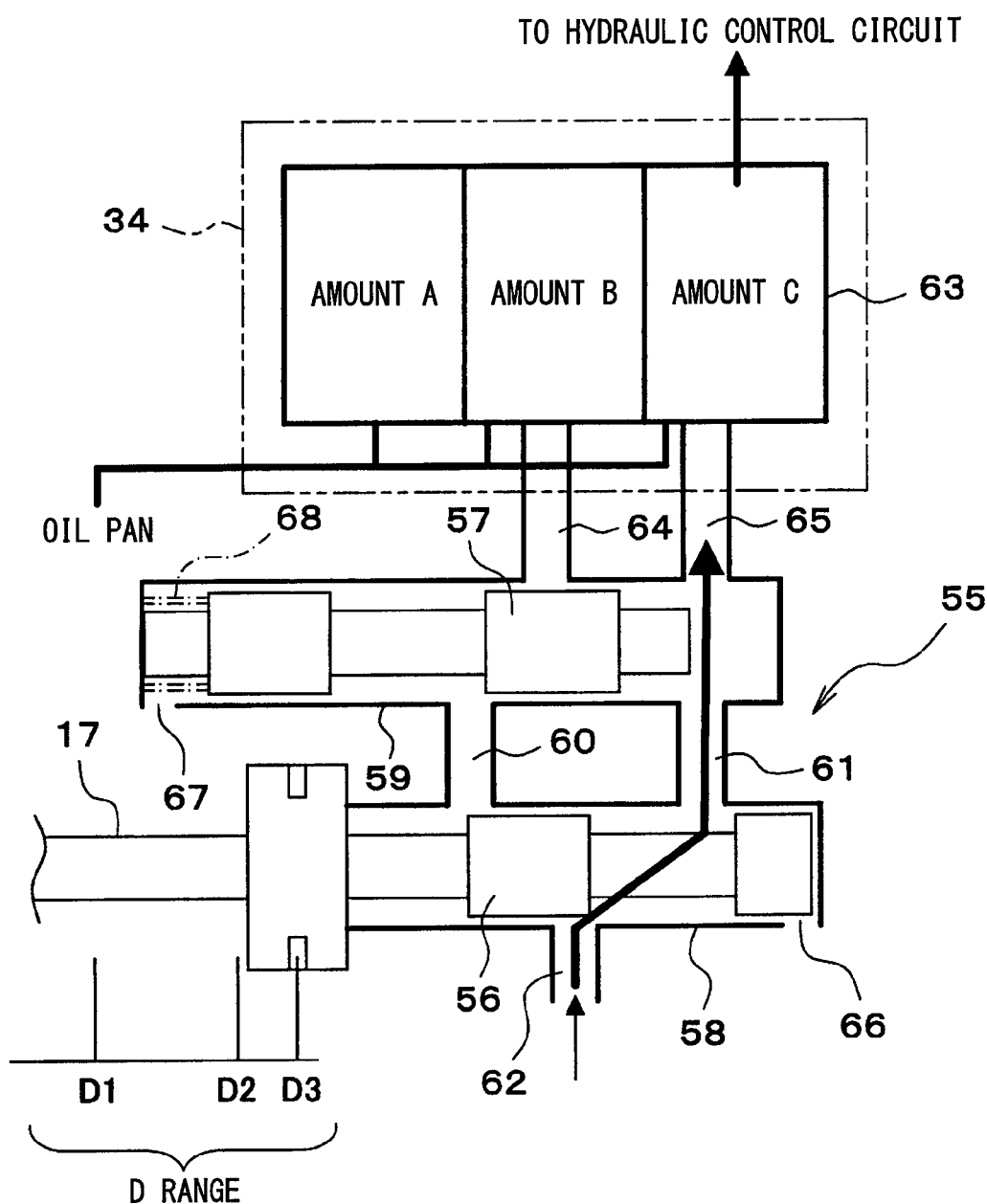
FIG. 11 is a view showing a switch operation mechanism and surrounding elements thereof during a low discharge mode.

Further, as shown in FIGS. 9 to 11, a switch operation mechanism 55 includes a first switch valve 56 and a second switch valve 57 for switching a hydraulic circuit. The first switch valve 56 is disposed to integrally move with the manual valve 17. A sleeve 58 of the first switch valve 56 is in fluid communication with a sleeve 59 of the second switch valve 57 through a first port 60 and a second port 61. The sleeve 58 of the first switch valve 56 includes an inlet port 62 through which hydraulic pressure is introduced. The sleeve 59 of the second switch valve 57 includes a first supply port 64 and a second supply port 65 which are in fluid communication with a varier unit 63 of the oil pump 34. Further, the sleeve 58 and the sleeve 59 include a drain port 66 and a drain port 67, respectively. The second switch valve 57 is biased by a spring 68 toward a direction that opens the first supply port 64.

The motor 27, which is the motive power source of the range switch mechanism 16, drives the manual valve 17 to displace the manual valve 17 in the axial direction. Accordingly, the first switch valve 56, which is disposed to integrally move with the manual valve 17, is also displaced in the axial direction when driven by the motor 27 of the range switch mechanism 16. The D range position of the manual valve 17 includes three switchable positions: a D1 range position, a D2 range position, and a D3 range position. Regardless of whether the manual valve 17 is in the D1 range position, the D2 range position, or the D3 range position, the hydraulic circuit of the automatic transmission 12 is maintained in the D range hydraulic circuit, such that the automatic transmission 12 is maintained in the D range.

Figure 12:
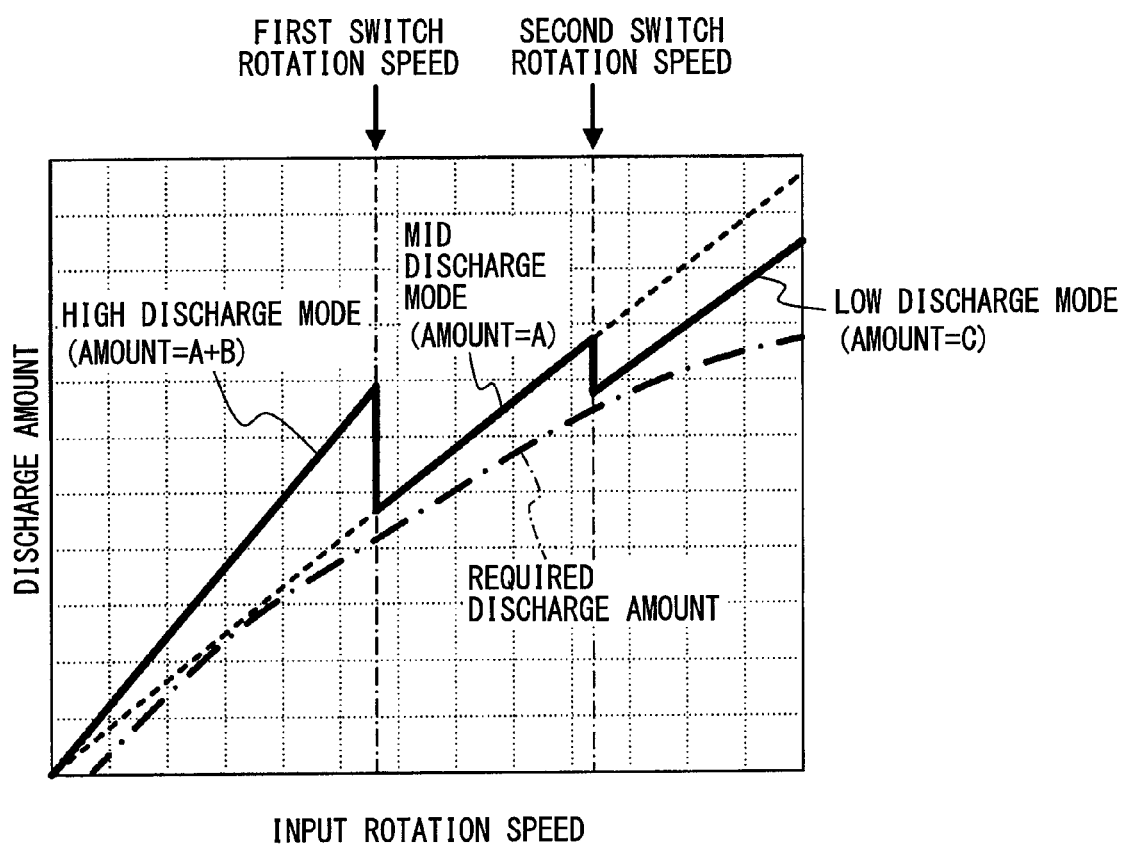
FIG. 12 is a chart showing a relationship between an input rotation speed and a discharge amount of an oil pump.

As shown in FIG. 9, when the manual valve 17 is moved to the D1 range position and the first switch valve 56 is moved to a position opening the first port 60 (i.e., a first operative position), an oil passage from the input port 62 to the first port 60 is open, and an oil passage from the input port 62 to the second port 61 is closed. In this case, the hydraulic pressure introduced through the input port 62 into the sleeve 58 of the first switch valve 56 is guided through the first port 60 into the sleeve 59 of the second switch valve 57. Accordingly, the second switch valve 57 is maintained in a position opening the first supply port 64, and an oil passage from the first port 60 to the first supply port 64 is opened. In other words, an oil passage is formed to supply hydraulic pressure through the first supply port 64 to the varier unit 63 of the oil pump 34. As a result, the hydraulic pressure introduced from the inlet port 62 into the sleeve 58 of the first switch valve 56 is supplied through the first port 60 and the first supply port 64 into the varier unit 63 of the oil pump 34, and the oil pump 34 is switched to the high discharge mode. As shown in FIG. 12, in the high discharge mode, the discharge amount of the oil pump 34 per revolution is higher than that of a mid discharge mode and the low discharge mode. For example, the high discharge mode may have a discharge amount per revolution of A+B.

Further, as shown in FIG. 10, when the manual valve 17 is moved to the D2 range position and the first switch valve 56 is moved to a position closing both the first and second ports 60, 61 (i.e., a second operative position), the oil passage from the inlet port 62 to the first port 60 is closed, and the oil passage from the inlet port 62 to the second port 61 is also closed. Accordingly, the supply of hydraulic pressure to the varier unit 63 of the oil pump 34 is stopped, and the oil pump 34 is switched to the mid discharge mode. As shown in FIG. 12, in the mid discharge mode, the discharge amount of the oil pump 34 per revolution is lower than that of the high discharge mode. For example, the mid discharge mode may have a discharge amount per revolution of A.

Further, as shown in FIG. 11, when the manual valve 17 is moved to the D3 range position and the first switch valve 56 is moved to a position opening the second port 61 (i.e., a third operative position), the oil passage from the inlet port 62 to the first port 60 is closed, and the oil passage from the inlet port 62 to the second port 61 is open. In this case, the hydraulic pressure introduced through the input port 62 into the sleeve 58 of the first switch valve 56 is guided through the second port 61 into the sleeve 59 of the second switch valve 57, and thus the second switch valve 57 is moved into a position closing the first supply port 64. Accordingly, an oil passage from the second port 61 to the second supply port 65 is open. In other words, an oil passage is formed to supply hydraulic pressure through the second supply port 65 to the varier unit 63 of the oil pump 34. As a result, the hydraulic pressure introduced from the inlet port 62 into the sleeve 58 of the first switch valve 56 is supplied through the second port 61 and the second supply port 65 into the varier unit 63 of the oil pump 34, and the oil pump 34 is switched to the low discharge mode. As shown in FIG. 12, in the low discharge mode, the discharge amount of the oil pump 34 per revolution is lower than that of the mid discharge mode. For example, the high discharge mode may have a discharge amount per revolution of C.

In other words, the switch operation mechanism 55 switches the manual valve 17 between the D1 range position, the D2 range position, and the D3 range position in order to switch the first switch valve 56 between a position where only the first port 60 is open, a position where both the first port 60 and the second port 61 are closed, and a position where only the second port 61 is open. As a result, the discharge amount of the oil pump 34 is switched between three levels.

Further, in the second embodiment, the AT-ECU 22 performs a discharge amount switching control routine as will be described later with reference to FIG. 13. In this control routine, the AT-ECU 22 reads the input rotation speed of the oil pump 34 when the manual valve 17 is in the D range position. Based on this input rotation speed, the position of the manual valve 17 (i.e., the position of the first switch valve 56) is switched using the motor 27, thereby switching the discharge amount of the oil pump 34 between three levels.

Specifically, as shown in FIG. 12, when the input rotation speed of the oil pump 34 is at or below a first switching rotation speed, the manual valve 17 is switched to the D1 range position using the motor 27. As a result, the first switch valve 56 is switched to the position opening the first port 60, and the oil pump 34 is switched over to the high discharge mode.

Further, when the input rotation speed of the oil pump 34 is above the first switching rotation speed and at or below a second switching rotation speed, the manual valve 17 is switched to the D2 range position using the motor 27. As a result, the first switch valve 56 is switched to the position closing both the first and second ports 60, 61, and the oil pump 34 is switched over to the mid discharge mode. Further, the first switching rotation speed may be set, for example, to ensure that even when switched to the mid discharge mode, the discharge amount of the oil pump 34 is maintained at or above the required discharge amount of the hydraulic control circuit 13.

Further, when the input rotation speed of the oil pump 34 is above the second switching rotation speed, the manual valve 17 is switched to the D3 range position using the motor 27. As a result, the first switch valve 56 is switched to the position opening the second port 61, and the oil pump 34 is switched over to the low discharge mode. Further, the second switching rotation speed may be set, for example, to ensure that even when switched to the low discharge mode, the discharge amount of the oil pump 34 is maintained at or above the required discharge amount of the hydraulic control circuit 13.

Hereinafter, the discharge amount switching control routine of FIG. 13, which is performed by the AT-ECU 22 of the second embodiment, will be explained.

Figure 13:
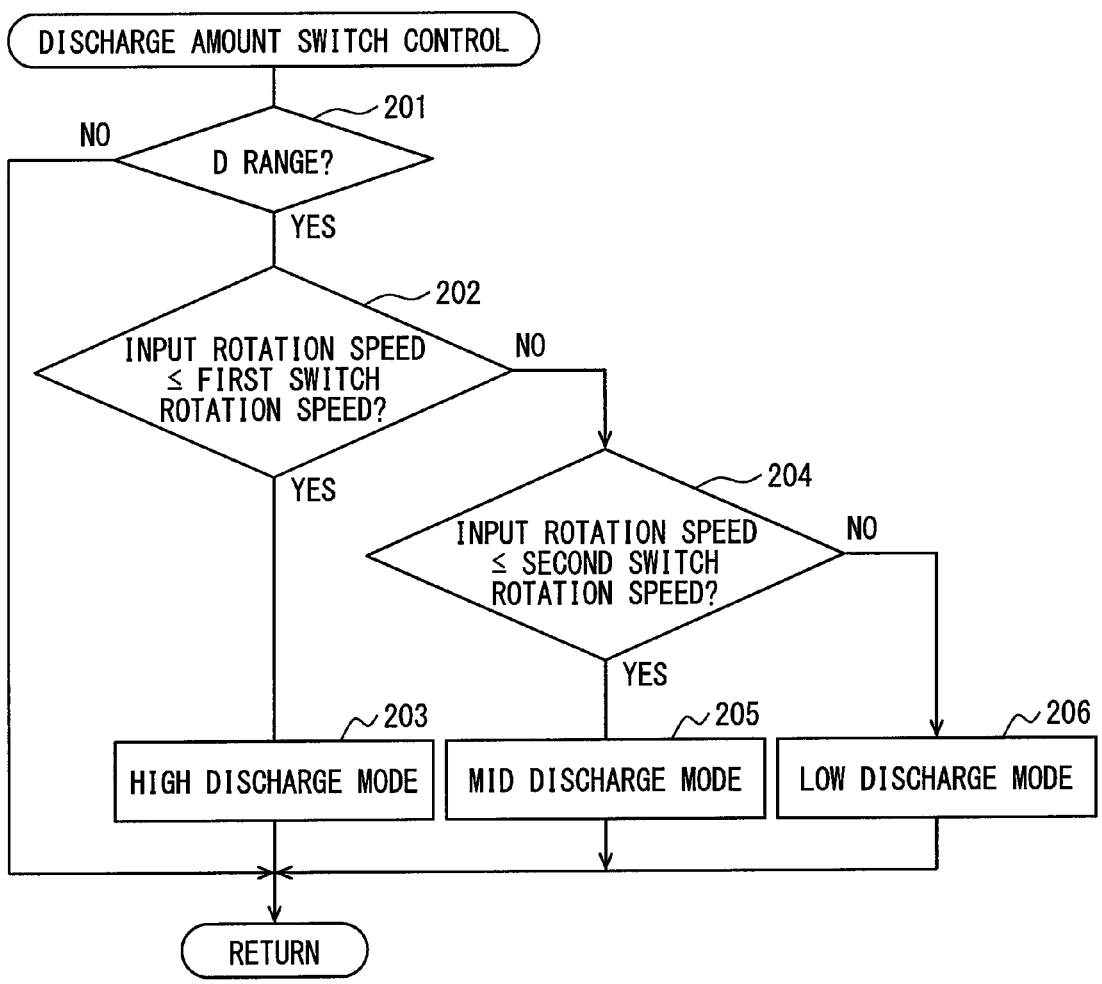
FIG. 13 is a flowchart showing processing of a discharge amount switching control routine.

First, at step 201 of the discharge amount switching control routine shown in FIG. 13, it is determined whether the current shift range is the D range (i.e., whether the manual valve 17 is in the D range position). At step 201, if it is determined that the current shift range is not the D range, the processing of step 202 and beyond is not performed, and the present control routine terminates.

Conversely, if it is determined at the above described step 201 that the current shift range is the D shift range, then the control routine continues to step 202. At step 202, it is determined whether the input rotation speed of the oil pump 34 is at or below the first switching rotation speed.

At step 202, if it is determined that the input rotation speed of the oil pump 34 is at or below the first switching rotation speed, then the control routine proceeds to step 203. At step 203, the manual valve 17 is switched to (or maintained at) the D1 range position by the motor 27, and thus the first switch valve 56 is switched to (or maintained at) the position opening the first port 61. As a result, the oil pump 34 is switched to (or maintained at) the high discharge mode. In the high discharge mode, the discharge amount of the oil pump 34 per revolution is higher than that of the mid discharge mode and the low discharge mode. For example, the high discharge mode may have a discharge amount per revolution of A+B.

Conversely, if it is determined at step 202 that the input rotation speed of the oil pump 34 is higher than the first switching rotation speed, then the control routine proceeds to step 204. At step 204, it is determined whether the input rotation speed of the oil pump 34 is at or below the second switching rotation speed.

At step 204, if it is determined that the input rotation speed of the oil pump 34 is at or below the second switching rotation speed, then the control routine proceeds to step 205. At step 205, the manual valve 17 is switched to (or maintained at) the D2 range position by the motor 27, and thus the first switch valve 56 is switched to (or maintained at) the position closing both the first and second ports 60, 61. As a result, the oil pump 34 is switched to (or maintained at) the mid discharge mode. In the mid discharge mode, the discharge amount of the oil pump 34 per revolution is lower than that of the high discharge mode. For example, the mid discharge mode may have a discharge amount per revolution of A.

Further, if it is determined at step 204 that the input rotation speed of the oil pump 34 is above the second switching rotation speed, the control routine proceeds to step 206. At step 206, the manual valve 17 is switched to (or maintained at) the D3 range position by the motor 27, and thus the first switch valve 56 is switched to (or maintained at) the position opening the second port 61. As a result, the oil pump 34 is switched to (or maintained at) the low discharge mode. In the low discharge mode, the discharge amount of the oil pump 34 per revolution is lower than that of the mid discharge mode. For example, the low discharge mode may have a discharge amount per revolution of C.

In the above described second embodiment, the motor 27 is used to switch the position of the manual valve 17 (in other words, the operative position of the first switch valve 56) based on the input rotation speed of the oil pump 34, thereby switching the discharge amount of the oil pump 34 between three levels. As a result, during high rotations speeds, wasteful energy consumption may be suppressed, and fuel economy may be improved.

Further, in the second embodiment, the switch operation mechanism 55 includes the first switch valve 56, which is driven by the motor 27 of the range switch mechanism 16, and the second switch valve 57, which is biased by the spring 68. The switch operation mechanism 55 switches the first switch valve 56 between a position where only the first port 60 is open, a position where both the first port 60 and the second port 61 are closed, and a position where only the second port 61 is open, in order to switch the discharge amount of the oil pump 34 between three levels. As a result, the discharge amount of the oil pump 34 is switched between three levels.

Further, in each of the above described first and second embodiments, the AT-ECU 22 performs the control routines of FIGS. 5 and 13. However, instead of the AT-ECU 22, another ECU (such as the SBW-ECU 23 or the engine ECU 18) may perform the control routines of FIGS. 5 and 13 instead.

Further, each of the above described first and second embodiments is applied to the automatic transmission oil pump 34. However, the embodiments of the present disclosure may be applied to other types of oil pumps (for example, an engine oil pump) instead.

Further, each of the above described first and second embodiments is applied to a system that rotatably drives the oil pump 34 using an engine 11 (i.e., an internal combustion engine), the engine 11 being mounted as a motive power source on a vehicle. However, the embodiments of the present disclosure may instead be applied to a system where the oil pump 34 is rotatably driven by a motor (i.e., an electric motor), or a system where the oil pump 34 is rotatably driven by both an internal combustion engine and an electric motor, the engine and motor being mounted as a motive power source on a vehicle.

Further, each of the above described first and second embodiments is applied to a system including a range switch mechanism that switches between four shift ranges: the P range, the R range, the N range, and the D range. However, the embodiments of the present disclosure may instead be applied to a system including a range switch mechanism that switches between two shift ranges: a P range and a "not P" range. Further, the embodiments of the present disclosure may also be applied to a system including a range switch mechanism that switches between three shift ranges, or between five or more shift ranges. Further, the embodiments of the present disclosure may also be applied to a system including a range switch mechanism that switches a transmission up and down using an electric actuator (e.g., a solenoid).

The invention claimed is:

1. A vehicular hydraulics supply device for a vehicle including a variable-capacity oil pump, the oil pump having a variable discharge amount and being rotatably driven by a vehicle motive power source of the vehicle, the vehicular hydraulics supply device comprising:
   an electric actuator that acts as a switching motive power source of a range switch mechanism, the range switch mechanism switching a range of a transmission; and
   a pump switch mechanism driven by the electric actuator to perform a switch operation for adjusting the discharge amount of the oil pump.

2. The vehicular hydraulics supply device of claim 1, wherein
   the oil pump supplies hydraulic pressure to a hydraulic control circuit of the transmission.

3. The vehicular hydraulics supply device of claim 1, further comprising:
   a controller that switches the discharge amount of the oil pump by using the electric actuator to switch an operative position of the pump switch mechanism according to an input rotation speed of the oil pump.

4. The vehicular hydraulics supply device of claim 1, wherein
   the pump switch mechanism includes a switch valve driven by the electric actuator, and
   the switch valve is switched between i) a first operative position that forms an oil passage which supplies hydraulic pressure to a varier unit of the oil pump, and ii) a second operative position that stops supply of hydraulic pressure to the varier unit of the oil pump, so as to switch the discharge amount of the oil pump between two levels.

5. The vehicular hydraulics supply device of claim 4, wherein
   the electric actuator is a motor,
   the range switch mechanism includes a detent lever fixed to a manual shaft, the manual shaft being coupled to a rotating shaft of the motor,
   a manual valve is coupled to the detent lever and is linearly displaced according a rotation of the detent lever, and
   the switch valve is disposed so as to integrally move with the manual shaft.

6. The vehicular hydraulics supply device of claim 1, wherein
   the pump switch mechanism includes
   a first switch valve driven by the electric actuator, a supply first port and a second supply port which are in fluid communication with a varier unit of the oil pump, and a second switch valve biased by a spring in a direction opening the first supply port, and the first switch valve is switched between i) a first operative position that maintains the second switch valve at a position opening the first supply port and that forms an oil passage which supplies hydraulic pressure through the first supply port to the varier unit of the oil pump, ii) a second operative position that stops supply of hydraulic pressure to the varier unit of the oil pump, and iii) a third operative position that causes the second switch valve to move to a position closing the first supply port and that forms an oil passage which supplies hydraulic pressure through the second supply port to the varier unit of the oil pump, so as to switch the discharge amount of the oil pump between three levels.

7. The vehicular hydraulics supply device of claim 6, wherein the electric actuator is a motor, the range switch mechanism includes a detent lever fixed to a manual shaft, the manual shaft being coupled to a rotating shaft of the motor, a manual valve is coupled to the detent lever and is linearly displaced according a rotation of the detent lever, and the first switch valve is disposed so as to integrally move with the manual shaft.

\* \* \* \* \*